United States Patent [19]

Maiocchi et al.

[11] 4,114,671
[45] Sep. 19, 1978

[54] PNEUMATIC TIRE FOR VEHICLES HAVING IMPROVED HANDLING AND ROAD GRIPPING

[75] Inventors: Luigi Maiocchi, Vernate-Frazione Moncucco (Milan); Luigi Silva, Muggio (Milan), both of Italy

[73] Assignee: Industrie Pirelli S.p.A., Milan, Italy

[21] Appl. No.: 758,487

[22] Filed: Jan. 11, 1977

[30] Foreign Application Priority Data

Jan. 26, 1976 [IT] Italy .............................. 19567 A/76

[51] Int. Cl.² .................... B60C 11/06; B60C 11/12
[52] U.S. Cl. ..................... 152/209 R; 152/DIG. 1; 152/330 R; 152/330 A
[58] Field of Search ................................ 152/209 R

[56] References Cited

U.S. PATENT DOCUMENTS

| | | | |
|---|---|---|---|
| 2,706,509 | 4/1955 | White | 152/209 R |
| 3,727,661 | 4/1973 | Hoke | 152/209 R |
| 3,841,374 | 10/1974 | Boileau | 152/209 R |
| 3,893,498 | 7/1975 | Wayne | 152/209 R |
| 3,951,193 | 4/1976 | Yeager | 152/209 R |
| 3,954,130 | 5/1976 | Verdier | 152/209 R |

*Primary Examiner*—Drayton E. Hoffman
*Assistant Examiner*—Laurence E. Williams
*Attorney, Agent, or Firm*—Stevens, Davis, Miller & Mosher

[57] ABSTRACT

A pneumatic tire for vehicles has a tread band provided with grooves which extend circumferentially about the tire. The grooves are formed by a series of substantially rectilinear sections which are disposed at a predetermined angle with the equatorial plane of the tire and intersect to impart a zig-zag arrangement to the grooves about the tire. The intersections between said groove sections are situated in planes parallel to the equatorial plane of the tire, and each tread surface portion between one of the parallel planes and a pair of adjacent sections of a groove is shaped so the distance at its points from the tire axis gradually decreases from the parallel plane toward the region in which the sections of the pair of adjacent sections intersect.

6 Claims, 10 Drawing Figures

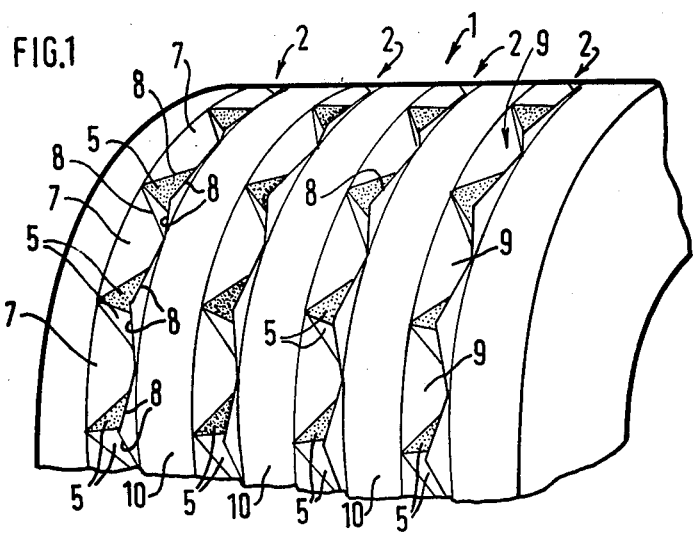
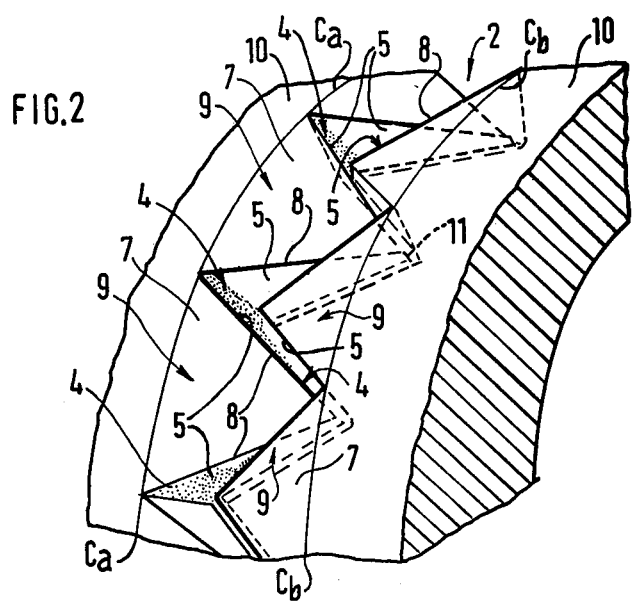

PNEUMATIC TIRE FOR VEHICLES HAVING IMPROVED HANDLING AND ROAD GRIPPING

This invention relates generally to a pneumatic tire for a vehicle and, more particularly to a pneumatic tire having improved tread wear particularly during the initial life of the tread and having handling and road grip properties which remain substantially uniform as the tread wears.

In the tread of a tire, particularly in that of a radial tire, whatever its design may be, there are usually formed two or more circumferential grooves, each of which has a plurality of rectilinear contiguous mutually intersecting sections arranged to provide a so-called "zigzag" arrangement i.e., a groove in which each section forms the same pre-established angle with the equatorial plane of the tire and intersects a contiguous section.

The purpose of these grooves is both to impart to the tire satisfactory handling characteristics which will allow keeping, for example, the drive direction, and to ensure a good grip on the road surface particularly when riding along a curve or on a wet road. It is known that road gripping properties are improved as the angle which each groove section forms with the equatorial plane of the tire increases; i.e., the smaller the distance, measured in the circumferential direction on the tread surface, between the intersections of the groove sections (pitch of the zigzag groove) the better the road gripping property of the tire.

In the tires of the type specified hereinabove, the circumferential grooves may be associated with any other tread design formed on the tread band between the grooves and the tire sidewalls. Anyhow, whatever the design may be, the characteristics of handling and road gripping depend substantially on the grooves, particularly when the tire exhibits advanced wear conditions, i.e., when the influence exerted by the tread design on the characteristics of the tire is negligable.

Hence, pneumatic tires of this type have some disadvantages. First of all, the road gripping properties obtainable with such tires varies considerably with the wear of the tire. In fact, during the initial period of use of the tire, all of the edges of the grooves contact the rolling surface, thus providing a maximum grip which, as is well-known, depends on the total length of the groove edges which contact the surface. The wear of a tire begins in the regions in which the intersections of the groove sections are located, so that in these regions, even in case of relatively moderate wear, the edges soon become rounded off and no longer contact the rolling surface. Hence, it is clear that the grip provided by the grooves and design of the tread decreases considerably with wear. In fact, the road gripping properties of the tire are reduced even though the tire has been exposed only to moderate wear.

Another disadvantage of the pneumatic tires of the type specified hereinabove is the irregularity of the wearing process during use. The tire region, particularly in case of radial tires, where the highest wear occurs is the region situated on the outermost portions of the tread. A higher wear occurs in these regions in the presence of circumferential tread grooves of the type described hereinabove, i.e., grooves having a zigzag configuration. In fact, the width of the tread band between a circumferential groove and the tire sidewall varies because of the zigzag configuration of the grooves. The maximum wear occurs in the regions of the tread band where the width of the band is smaller (this being due to the presence, in these regions, of the intersections between two groove sections). It thus follows that regions of localized wear are formed in the tread. These are very dangerous because as the wear progresses the wear rate tends to increase thereby reducing in these regions the efficient tread surface which comes into contact with the rolling surface.

The object of the present invention is to provide a pneumatic tire for motor vehicles which is free from the disadvantages mentioned hereinabove. Another object of the invention is to provide a pneumatic tire having road gripping properties which remain substantially constant as the tread wears and having a tread which wears slowly and uniformly over the whole surface of the tread, thus preventing the formation of localized wear regions.

Other objects will become apparent from the following description with reference to the accompanying drawing wherein FIG. 1 is a perspective view showing a portion of one embodiment of the tire provided by the invention;

FIG. 2 shows a detail, partially in section, of the tire shown in FIG. 1;

The foregoing objects and others are accomplished in accordance with the invention, generally speaking, by providing a pneumatic tire for vehicles having a tread band provided with circumferential grooves, each of which has a plurality of substantially rectilinear sections which inpart a zigzag appearance to the groove, i.e., an arrangement in which each groove section forms the same pre-established angle with the equatorial plane of the tire and intersects a contiguous section, the intersections between the groove sections being disposed in planes which are substantially parallel to the equatorial plane of the tire. Each tread surface portion between one of the parallel planes and a pair of the contiguous sections of a groove is shaped in such a manner that the distance of its points from the tire axis gradually decreases from the parallel plane toward the region in which the sections of the pair intersect one another.

Figure 4:
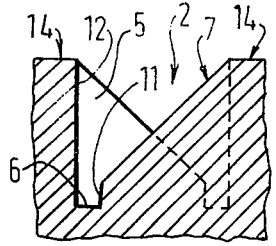
FIGS. 4 and 5 are sectional views of the detail of FIG. 3 along lines IV—IV and V—V respectively of FIG. 3.
Figure 5:
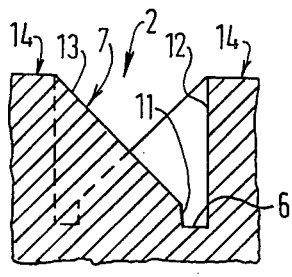
Figure 3:
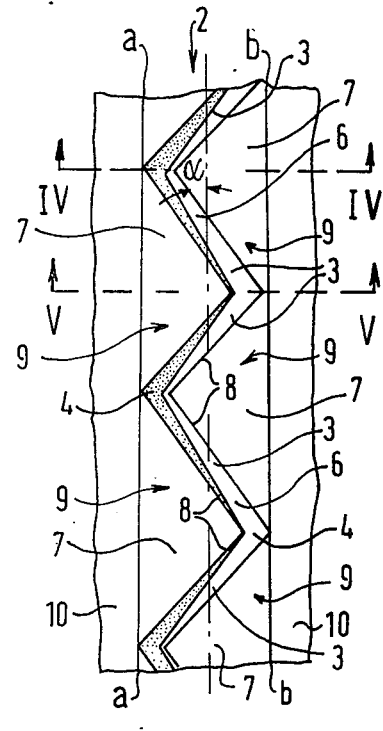
FIG. 3 is a top view of the detail of FIG. 2 shown as developed on a plane.
Figure 6:
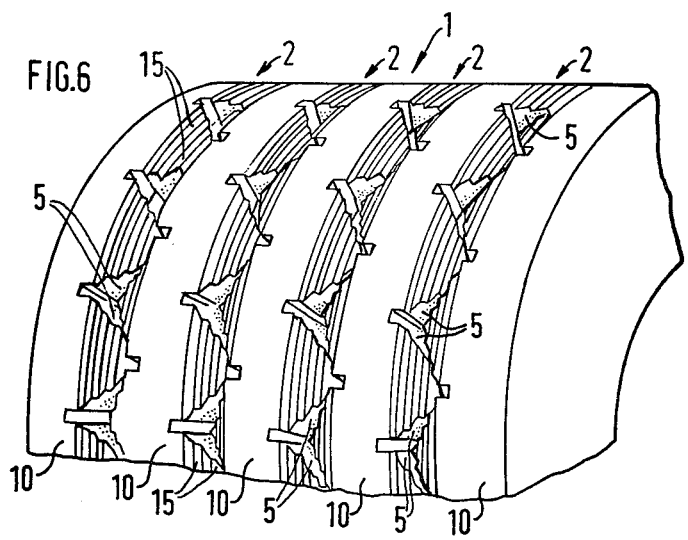
FIG. 6 is a perspective view of a portion of a second embodiment of the tire provided by the invention.

Referring now to FIGS. 1 through 5 of the drawing, one embodiment of the tire invention has a tread 1 having four laterally spaced circumferential grooves 2 formed therein. The shape of each of these grooves is clearly visible in FIG. 3 in which a portion of one of them is shown as developed on a plane and as seen from above; each groove having a plurality of rectilinear sections 3 which combine to impart a so-called zigzag arrangement to the groove; i.e., an arrangement in which each groove section forms a pre-established angle (angle α) with the equatorial plane of the tire (for the sake of simplicity the angle is shown in FIG. 3 as being referred to a parallel plane instead of being referred to the equatorial plane of the tire). As can be seen from FIG. 3, each section 3 is symmetrical to the contiguous section, so that each pair of contiguous sections intersects at an intersection region, indicated by reference numeral 4 (FIG. 3), to bring about a substantially broken line formed by a plurality of V-shaped portions. Each groove section 3 is laterally defined by substantially plane surfaces 5 (FIG. 2) and by a substantially cylindrical bottom surface 6 (FIGS. 3, 4, and 5). Surface 5 may have any inclination with respect to bottom surface 6. The intersection regions 4 of the sections 3 are located substantially in two parallel planes of the tire; the path of the planes is indicated in FIGS. 2 and 3 by a—a and b—b.

According to the invention, each tread surface portion 7 between one of the parallel planes a—a and b—b (FIG. 3) and a pair of contiguous groove sections 3 (FIG. 2) has such a configuration that the radial distance of its points from the axis of the tire gradually decreases beginning from the plane toward the region in which the sections of the pair mutually intersect (region 4).

As can be seen clearly from the drawing, each surface portion 7, by intersecting with the side surfaces 5 which define laterally each groove section 3, originates edges 8 which are substantially inclined toward the axis of the tire. As shown in FIG. 2, surface portions 7 and side surfaces 5 substantially define a plurality of prismatic blocks 9. These blocks, therefore, are situated between a pair of substantially cylindrical tread bands 10, whose surface intersects the surface portions 7 which delimit them on the upper part substantially along circumferences $C_a$, $C_b$ (FIG. 2). On the cylindrical tread bands 10, there may be formed any design, no design, however, being shown in the drawing, for the sake of simplicity. The height of each block 9 is, thus, decreasing from the circumference from which it originates, toward the other one. Conveniently, the inclination of each surface portion 7 is chosen in such a way as to have the height 11 of the leading edge of the respective block, (FIGS. 2, 4, and 5), with respect to the bottom surface 6 of the groove 2, on the order of several millimeters.

Thus, it is obvious that with the arrangement described hereinabove, each block 9 protruding axially from one of the bands 10 is situated between a pair of corresponding blocks 9 protruding from the other band and is separated therefrom by the zigzag groove 2. Hence, the leading edge 11 of each block, which has the minimum height, is situated in front of the edge 12 (FIGS. 4 and 5) having the maximum height, generated by the intersection of a pair of side surfaces 5 of the groove sections 3.

Therefore, by intersecting any one of the zigzag grooves 2 with a radial plane of the tire, as shown in FIGS. 4 and 5, the profile visible in the Figures is obtained, in which, namely, the line of intersection of the surface portion 7 of a block with the cutting plane, which line is indicated by reference numeral 13, is considerably inclined with respect to the profile 14 (FIGS. 4 and 5) of the tread surface and is situated in front of the edge 12 obtained by the intersection of the side surfaces 5 of the two blocks 9 between which the block is interposed.

The embodiment of the tire shown in FIGS. 6 to 10 differs from the just described one in that a plurality of substantially circumferential steps 15 are formed in surface portions 7. Therefore, in this case, each block is delimited on the upper part by a stepped surface, visible in the cross-sections of FIGS. 9 and 10. The number of steps, which is four in the embodiment shown, may be varied.

Furthermore, in the embodiment shown in FIGS. 6 to 10, at each intersection region 4 of the groove sections 3 there are formed recesses 16 (FIGS. 7 and 8) communicating with regions 4. As shown in the cross-section of FIG. 9, the depth of the recesses 16 is smaller than that of the groove sections 3, so that the bottom surface 17 of each of recesses 16 is situated at a higher level than the bottom surface 6 of sections 3.

The behavior of the described tire during use is as follows.

Let us first consider the behavior of the tire of the first embodiment shown in Figures from 1 to 5. If the material of the tread were perfectly indeformable, only the designs formed on the cylindrical bands 10 would contact the surface on which the tire rolled while the edges 8 of blocks 9 would be completely excluded from such contact. However, because of the deformability of the material, the contact extends also to the part of the edges 8 which is disposed close to the circumferences $C_a$, $C_b$ which separate the blocks from the bands. It is obvious that with a new tire, the length of the edge part which is in contact with the plane is small and depends on the deformability of the tread material. It is also apparent that under these conditions the characteristics of the tire, as regards both its handling characteristic and road gripping properties substantially depend on the tread design formed on the cylindrical bands 10 with very little or no action being exerted by blocks 9 to improve the characteristics. It is obvious, however, that even in the absence of such action, since the tire is new, the characteristics are substantial. As the wear of the tire proceeds, and consequently the diameter of the cylindrical bands 10 decreases, a gradually increasing part of the edges 8 of blocks 9 comes into contact with the rolling surface. In fact, as the wear increases edges 8 place themselves substantially on the same cylindrical surface on which the worn bands 10 are situated. Therefore, in medium wear conditions of the tire, when the contribution to handling and gripping characteristics provided by the designs formed on bands 10 has been reduced from that of a new tire, those characteristics are considerably increased by edges 8 as the portion of edges 8 in contact with the rolling surface increases. When the tire reaches its maximum wear condition, supposed to correspond to that in which the reduction of the tread thickness is equal to the difference between the lengths of the edges 12 and 11 shown in FIGS. 4 and 5, the length of the edges 8 in contact with the rolling surface is at its maximum value and is equal to the one which can be seen in the plane development of FIG. 3. It is obvious that under these conditions the contribution afforded by edges 8 to the handling and gripping characteristics is the maximum obtainable. Thus, the tire according to the invention behaves as a tire provided with circumferential grooves arranged according to a zigzag configuration, in which the influence on the behavior of the tire progressively increases with wear. In fact, in case of moderate wear conditions, only those parts of edges 8 which have a reduced length and which are situated in proximity to the circumferences $C_a$, $C_b$ come into contact with the rolling surface and the length of the parts gradually increases with wear, reaching its maximum extension, equal to that of the entire development in plane of the edges, when the wear of the tread is at its maximum. Since the parts of edges 8, whatever their length may be, form a pre-established angle with the equatorial plane of the tire, they are able to impart to the tire good handling and gripping characteristics even when the length is rather reduced. Therefore, when the characteristics, on the one hand, would tend to become reduced as the design of the bands 10 becomes worn, on the other hand, they are increased by the action of the edges 8 of gradually increasing length, so that on the whole the handling and gripping characteristics of the tire remain substantially constant during the whole period of use of the tire.

The tire of the second embodiment shown in FIGS. 6 to 10 behaves in the same way.

Figure 7:
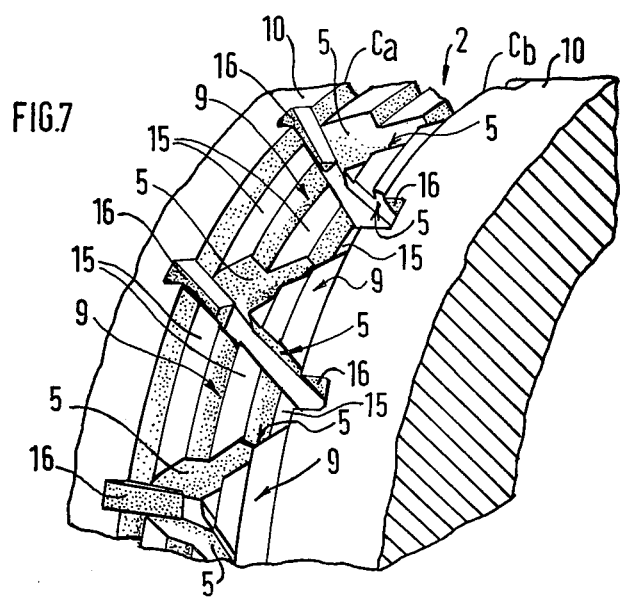
FIG. 7 shows a detail, partially in section, of the tire shown in FIG. 6.
Figure 9:
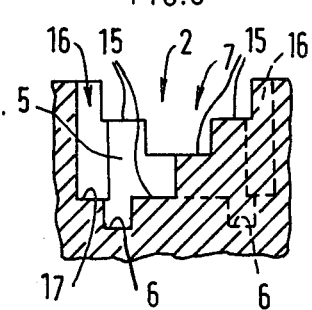
FIGS. 9 and 10 are sectional views of the detail of FIG. 8 along lines IX—IX and X—X, respectively of FIG. 8.
Figure 10:
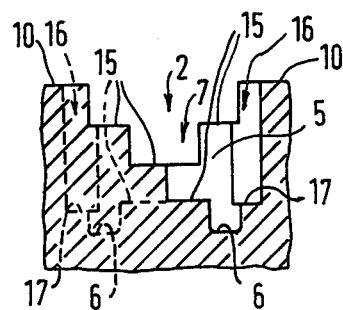
Figure 8:
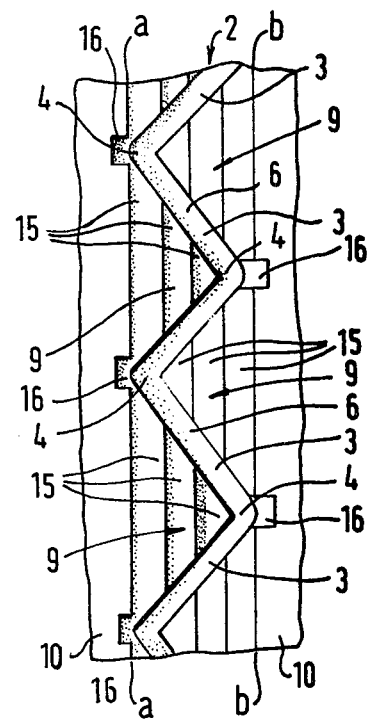
FIG. 8 is a top view of the detail of FIG. 7, shown as developed on a plane.

As the wear of this tire proceeds, parts of edges 8 whose length increases gradually come into contact with the rolling surface. However, the length of edges 8 does not continuously increase as in the tire of the preceding embodiment, but discontinuously, inasmuch as there is a pre-established increase of the length of the edges 8 upon reaching a degree of wear which brings about a tread thickness reduction equal to the height of one of the steps 15 (FIGS. 7, 9, and 10).

Moreover, in this tire recesses 16 have been provided which, with their edges, are permanently in contact with the rolling plane of the tire, whatever the wear condition of the tread may be. Thus, recesses 16 are able to contribute to the handling and gripping characteristics both in a new tire and in a worn one. It is clear, however, that the recesses 16 must not necessarily be associated with the tire structure described hereinabove and shown in the drawings, the behavior of the tire as described hereinabove being independent from the presence of such recesses.

Even if, in the embodiments described and represented, the tire tread has four circumferential grooves, it is obvious that they may be provided in any other suitable number. For example, only two grooves, each of which may be disposed in the axially outer part of the tread may be provided. Furthermore, those tread parts on which the grooves do not extend can have any desired design, which for the sake of simplicity, has not been illustrated. Alternately, the surface of such parts may be completely smooth. Hence, the bands 10 between two contiguous grooves 2 or between one of these grooves and a sidewall of the tire may be smooth or provided with any design desired.

Although the invention has been described in detail for the purpose of illustration, it is to be understood that such detail is provided solely for that purpose and that variations can be made therein by those skilled in the art without departing from the spirit and scope of the invention.

We claim:

1. A tire for vehicle wheels having a tread provided with at least one groove of zig-zag configuration with respect to the circumferential direction of the tire, each groove occupying a portion of tread defined by a pair of parallel planes perpendicular to the axis of said tire, wherein contiguous pairs of groove lengths alternatively meet at an apex causing said tread portion to appear to be divided into blocks, each block being defined by said contiguous pairs of groove lengths and by that portion of the tread surface between said parallel planes facing said apex and wherein the radially external surface of said blocks is inclined towards the axis of said tire and proceeds in the axial direction from the plane wherein a block is terminated towards the facing plane to form in a new tire a tread pattern, whose tread portion constitutes the contact area of said tire, comprising a circumferential rectilinear groove having the same width as the distance between said parallel planes and which will cause, with tread usage, an increase in the radially external surface portion of said blocks which contact the ground and will cause a modification in said tread pattern that progressively annuls the circumferential rectilinear grooves while at the same time emphasizing the zig-zag grooves.

2. The tire of claim 1 wherein said radially external surface of said blocks, with respect to said apex, has a minimum distance from the axis of said tire, which is greater than that distance between said axis and the bottom of the zig-zag groove.

3. The tire of claim 1 wherein said radially external surface of the blocks is substantially plane.

4. The tire of claim 1 wherein said radially external surface of said blocks has a step-like shape and wherein the radially external surface of each step is curved in the circumferential direction.

5. The tire of claim 1 wherein the tread portions containing a zig-zag groove are axially separated from each other by tread surface bands, a recess communicating with said groove having been formed in the bands corresponding with each apex.

6. The tire of claim 5 wherein the distance of the bottom of each one of the recesses from the tire axis is greater than the distance of the bottom of said zig-zag groove from said axis.

* * * * *